Figure 7:
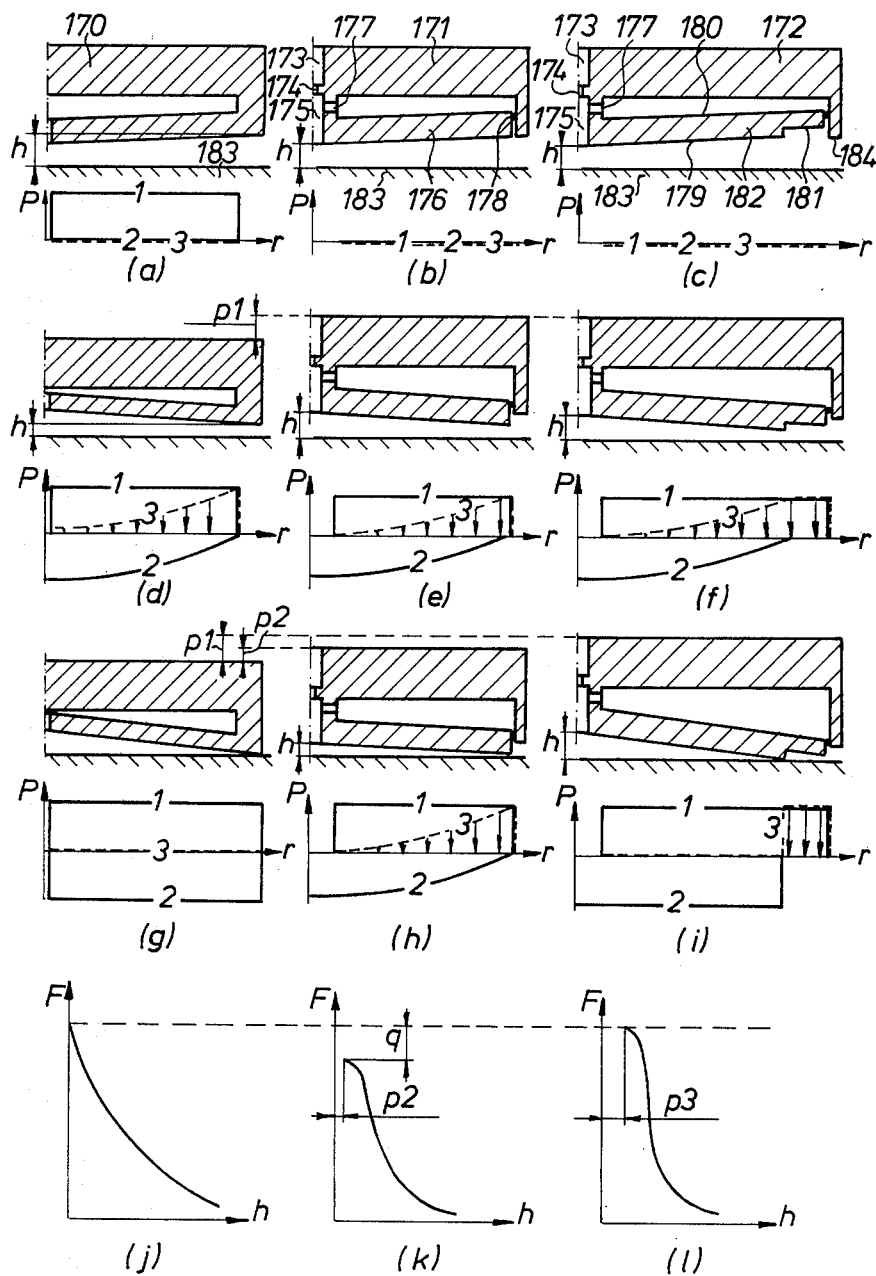

United States Patent [19]

Blondeel

[11] 4,045,098

[45] Aug. 30, 1977

[54] FLUID BEARING

[75] Inventor: Eric Jozef Blondeel, Brugge, Belgium

[73] Assignee: AGFA-GEVAERT N.V., Mortsel, Belgium

[21] Appl. No.: 619,967

[22] Filed: Oct. 6, 1975

[30] Foreign Application Priority Data

Aug. 10, 1974  United Kingdom .............. 43554/74

[51] Int. Cl.² ............................................. F16C 17/16
[52] U.S. Cl. ....................................... 308/9; 308/107; 308/122
[58] Field of Search ...................... 308/9, 93, 107, 122, 308/123

[56] References Cited
U.S. PATENT DOCUMENTS 3,513,934  5/1970  Crowley .............................. 308/9 X
3,806,209  4/1974  Laing et al. .............................. 308/9
3,893,733  7/1975  Silver et al. .............................. 308/9

Primary Examiner—Joseph F. Peters, Jr.
Assistant Examiner—Gene A. Church
Attorney, Agent, or Firm—William J. Daniel

[57] ABSTRACT

A fluid bearing, which is an aerostatic bearing, wherein one of the surfaces which determine the bearing gap is compliant, so that the geometry of the bearing gap may increase upon increasing load. The notion "compliant" stands for surfaces that are clamped at one point and that are displaceable at a remote point by deformation of the surface, such as steel membranes for thrust bearings, as well as for surfaces that are not deformable but that may pivot about a given point, such as bearing sleeves for rotatable shafts. By the application of compensation the bearing stiffness may be increased.

28 Claims, 36 Drawing Figures

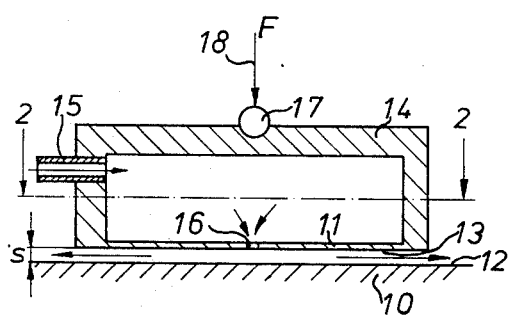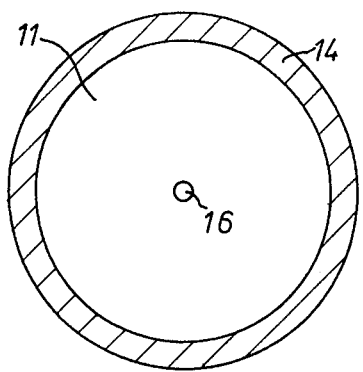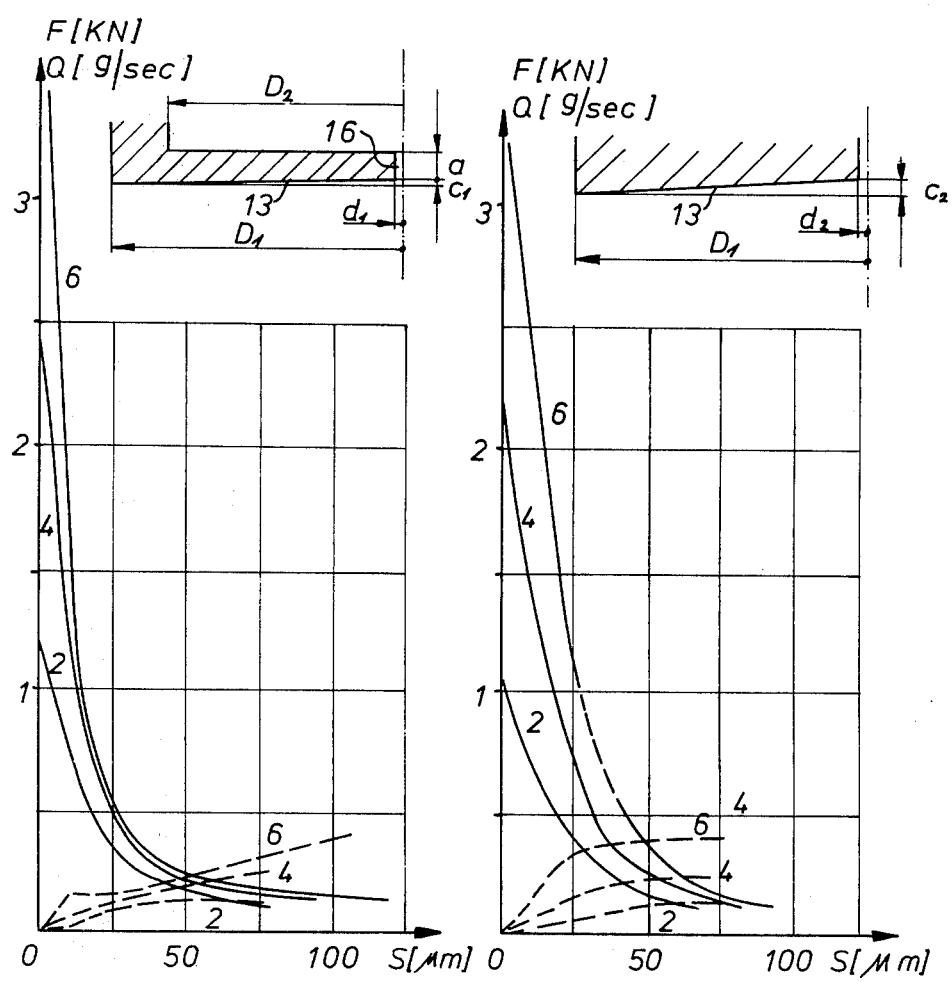

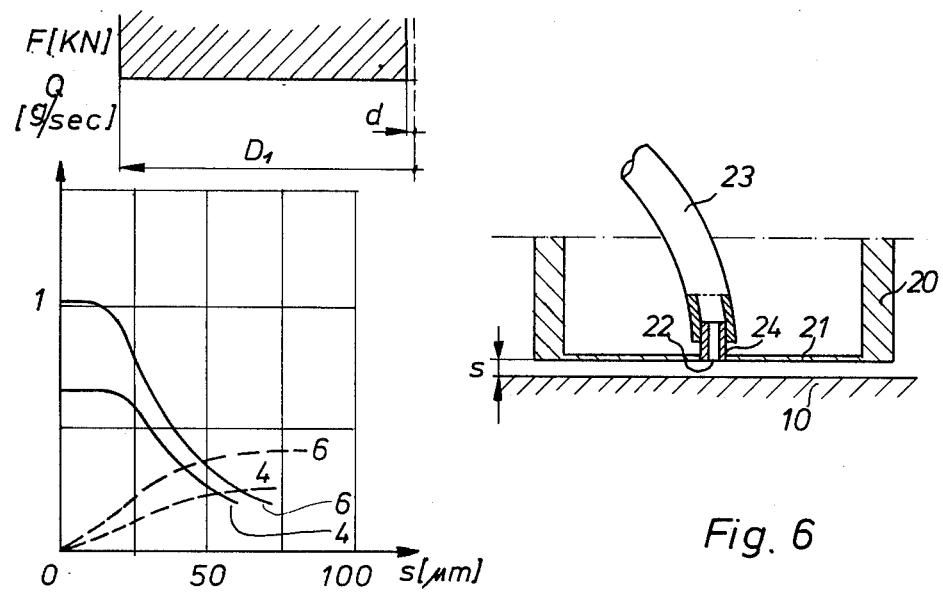
Fig. 5
Fig. 6
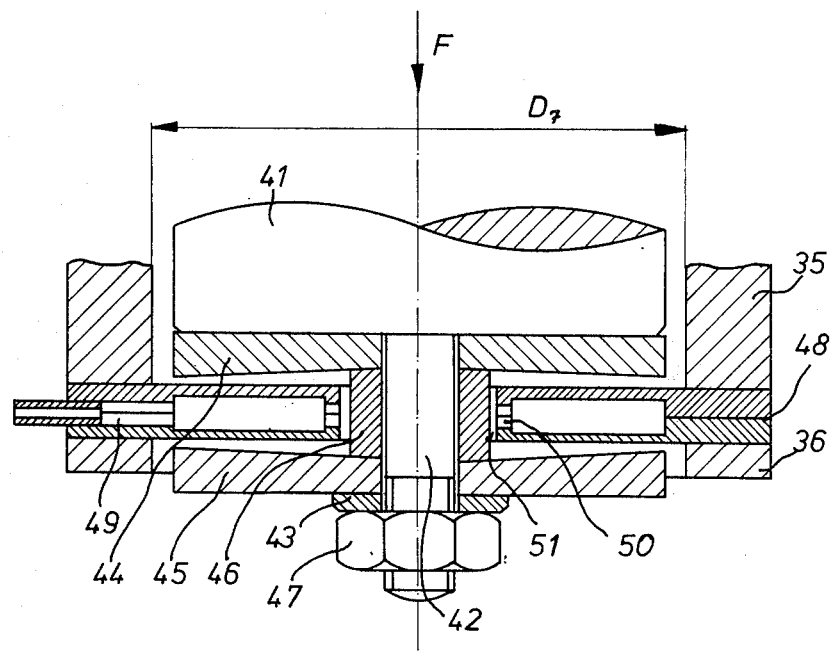
Fig. 10

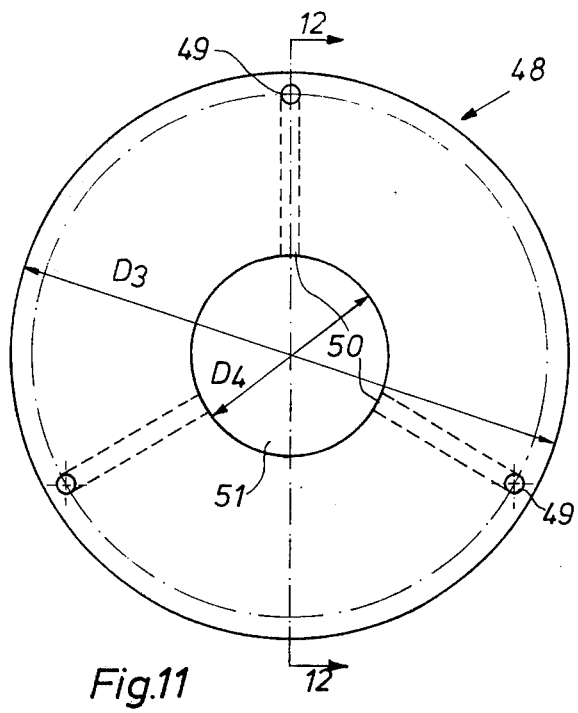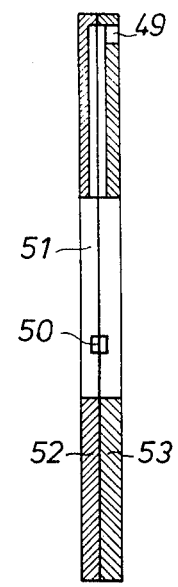
Fig.11    Fig.12
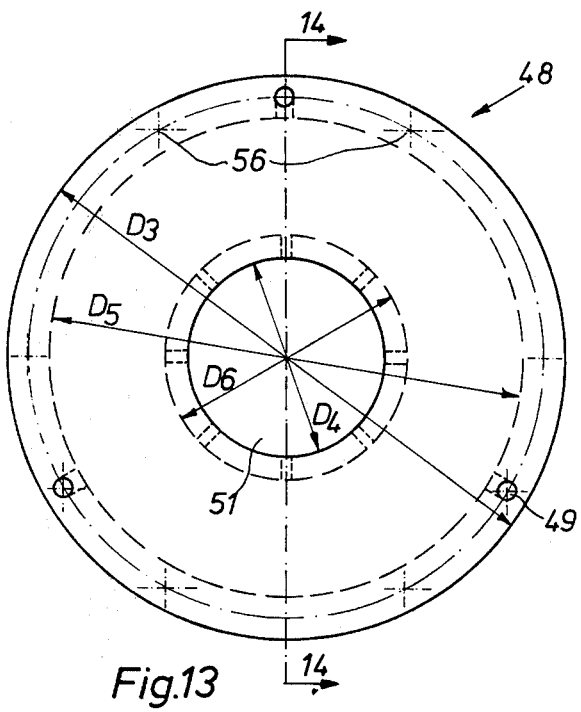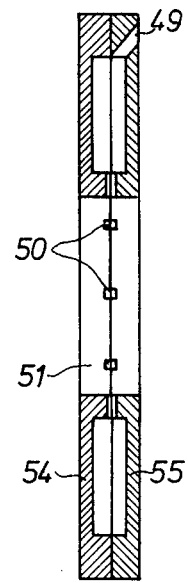
Fig.13    Fig.14

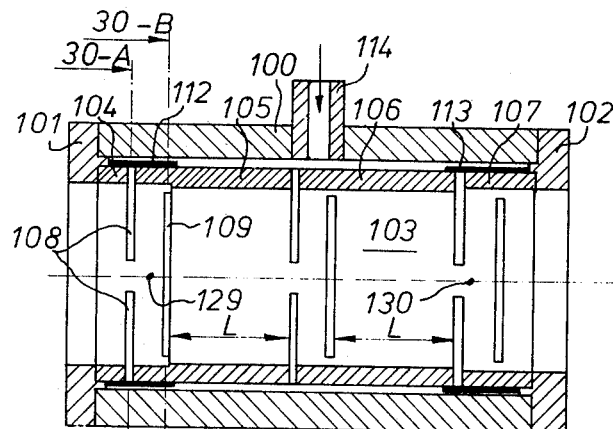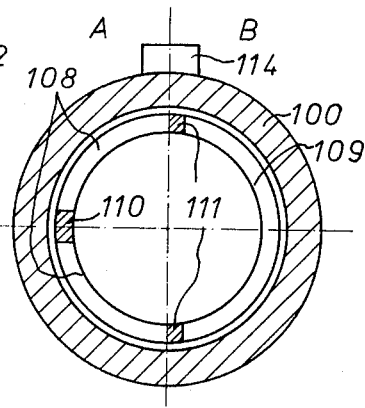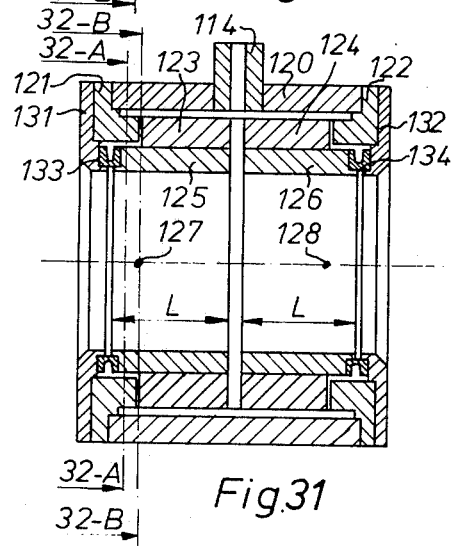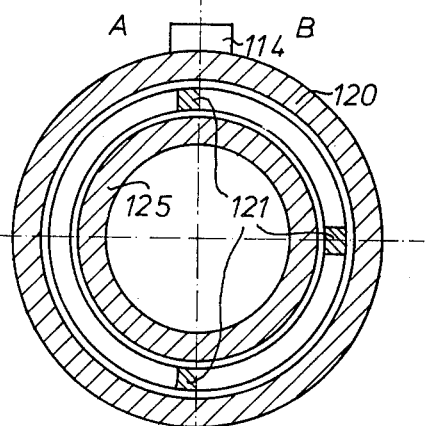
Fig. 29  Fig. 30  Fig. 31  Fig. 32
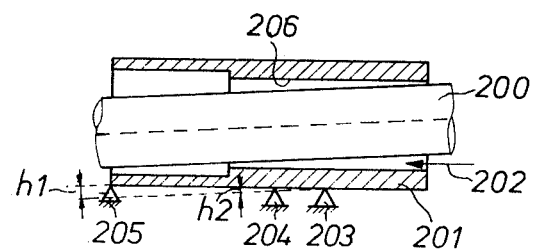
Fig. 33

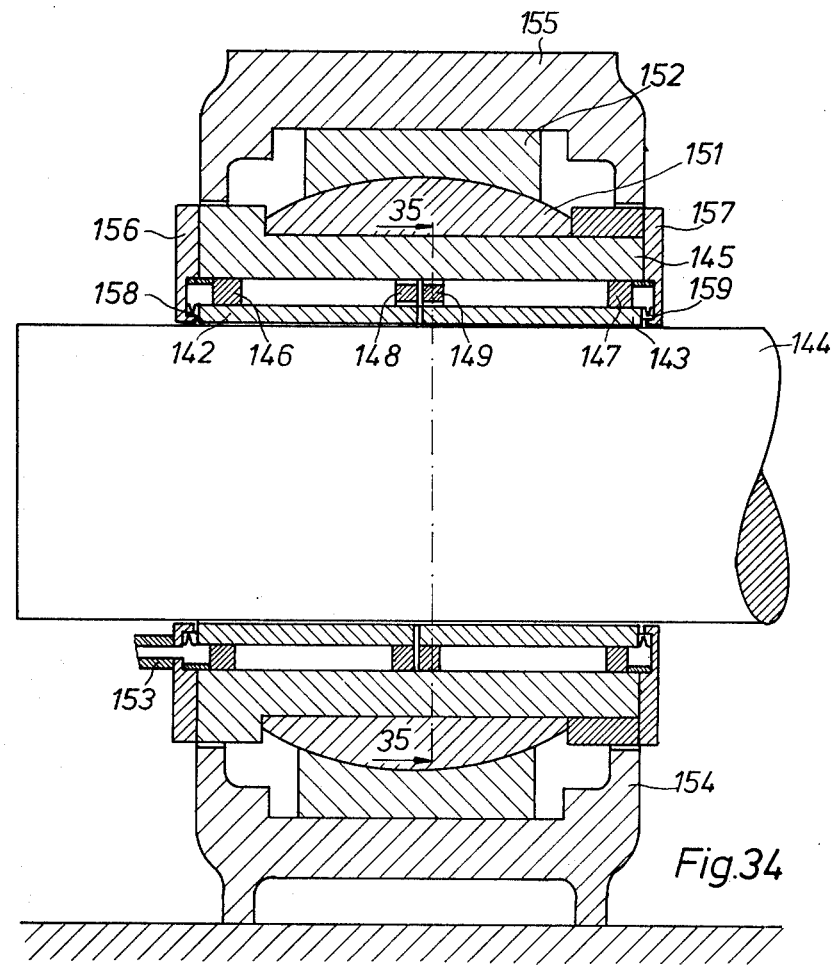
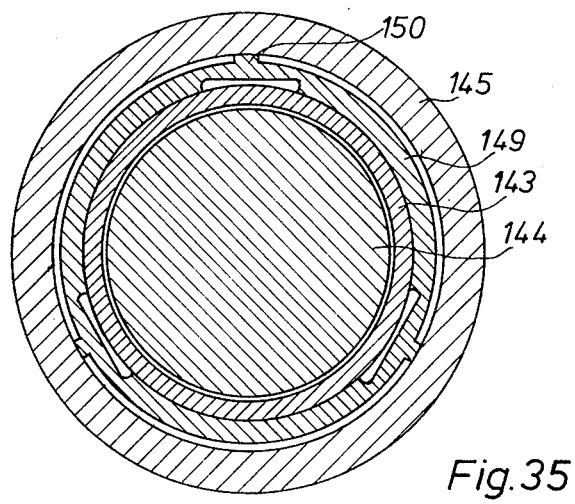
Fig.34
Fig.35

FLUID BEARING

The present invention relates to a bearing adapted to support a load transmitting object so that a surface of the bearing and a surface of a portion of the load transmitting object together define a bearing gap in communication with a fluid supply via a fluid inlet zone from which fluid under pressure can flow along said gap to one or more fluid outlet zones. Bearings of this type will herein be referred to as fluid bearings.

The pressurized fluid used may be a compressible fluid, for example air, steam or helium, or it may be substantially non-compressible, such as water or oil. Fluid bearings may be constructed for several purposes, e.g. as thrust bearings, trough bearings, ball and cup bearings and sleeve bearings.

Several types of fluid bearings are known, but while being satisfactory for use in low load conditions, their behaviour characteristics under higher load conditions are unsatisfactory. In particular, known fluid bearings suffer from instability, particularly when the pressurized fluid used is gaseous. It is known to make one of the bearing surfaces of an elastomeric material such as rubber, and therefore compliant under the influence of variations in fluid pressure in the bearing gap, but the elastic properties of such surface have usually been unsatisfactory especially for use with gases. Each of these disadvantages can lead to the possibility of mutual contact of the bearing surfaces at relatively low loads. This is destructive of the bearing or supported object especially at high relative speeds between the bearing surfaces or where the object has a delicate surface, these being cases for which fluid bearings are commonly used.

The present invention aims to provide fluid bearings of increased stability and/or maximum load capacity, and accordingly, as broadly defined, resides in a fluid bearing for supporting a load transmitting object wherein a surface of the bearing and a surface of a portion of said load transmitting object together define a bearing gap in communication with a fluid supply via a fluid inlet zone from which fluid under pressure can flow along said gap to one or more fluid outlet zones and wherein one of said surfaces is compliant and comprises the fluid inlet zone, so that at any bearing load within a certain range the said gap will exhibit where load supporting reaction forces occur, convergence in the direction of fluid flow and any increase in such load within the said range will cause a relative displacement of said surfaces involving an increase in said convergence.

The invention particularly but not exclusively comprehends fluid bearings fed with a pressurized compressible fluid whose pressure variations cause the said relative displacement of the bearing surfaces.

The bearing gap in a fluid bearing according to this invention may have different configurations according to the use for which it is designed. For example, the bearing may be a thrust bearing with a circular bearing gap having a central fluid inlet zone from which pressurized fluid flows radially outwardly to a circumferential fluid inlet zone, or it may be a sleeve bearing in which the gap is of the form of the surface of a tube and in which pressurized fluid flows from one end to the other. It will be appreciated that in the case of a thrust bearing, load supporting reaction forces will prevail across substantially the whole of said bearing gap, whereas in the case of a sleeve bearing supporting a shaft, load forces on the shaft will cause load supporting reaction forces to occur in a portion of the bearing gap.

The fluid bearings particularly comprehended by the present invention are those wherein the composition of a compliant surface is such that the material defining such surface will not flow when subjected to load supporting reaction forces.

That means that the material defining such surface is not subject to local deformations — and thus neither to local changes of the geometry of the bearing gap under the influence of, for instance, standing wave patterns of the fluid medium — when subjected to load supporting reaction forces. This implies that the modulus of elasticity of such compliant surface should be sufficiently high, and a value which is indicative of the lower limit of said modulus of elasticity of such composition in the application of the invention is $10^4 kg/cm^2$. It is thus clear that elastomers such as rubber and the like, and relatively easily deformable plastics such as polytetrafluoroethylene, are excluded from use in the present invention, whereas materials such as aluminium and steel, and plastics such as epoxi-compounds either or not reinforced by fibers, are extremely suited for use in a bearing according to the invention.

Provided that an appropriate geometry of the fluid flow path is chosen, a bearing according to the present invention will have very good characteristics in terms of its stiffness and maximum load capacity, and will also have high stability even when the fluid is compressible. Previously known compliant bearing using compressible fluids have generally had poor stability under almost all load conditions.

At the present stage of development it seems that a number of factors influence the load, stiffness and stability characteristics of fluid bearings constructed in accordance with this invention, and preference is given to bearings as above defined and having one or more of the following features:

a. said convergence is exhibited over the greater part of the distance between said fluid inlet zone and said fluid outlet zone, and optimally is exhibited over the whole or substantially the whole of that distance;

b. said convergence is exhibited from a position at the fluid inlet zone;

c. said surface of the bearing is compliant;

d. said convergence is substantially continuous, that is to say, the gap does not converge step-wise, so that abrupt changes in the size of the bearing gap in the direction of fluid flow are avoided, as is the abrupt onset of any such changes.

The adoption of any or all of these features enables the achievement of a fluid bearing having high stability over a very wide load range and a high maximum load capacity. High bearing stiffness can also be achieved. In particular, the avoidance of abrupt changes in the size of the bearing gap is conductive to laminar flow or at least the avoidance of unpredictable variations in the pressure gradient between the fluid inlet and outlet zones.

Fluid bearings as above defined may be designed as e.g. thrust bearings or sleeve bearings, but the present invention also has particular reference to a novel form of fluid sleeve bearing.

According to said novel form of fluid sleeve bearing, the compliant surface of the bearing, is the surface of a bearing sleeve which is mounted for angular displacement relative to the supported load transmitting object in dependence upon variations in the distribution of fluid pressure in the bearing gap which are consequent upon variations in the applied load.

In fluid bearings according to said novel form, the said bearing gap may be, and preferably is, parallel sided when no load is applied.

The bearing sleeve is preferably mounted for displacement about a pivot point nearer to a said fluid outlet zone than to the fluid inlet zone.

The invention further includes double sleeve fluid bearings wherein there are two bearing sleeve portions which, together with surfaces of portions of the supported load transmitting object, define bearing gaps having a common fluid inlet zone.

Still another aspect of the invention relates to stiffness compensation of a fluid bearing. From the foregoing, it may be concluded that the relative displacement of the bearing surfaces at increasing load, whereby the convergence of the bearing gap is increased, requires a relative displacement between the bearing member and the load transmitting object. The mentioned relative displacement of the two members as a function of changes in load condition determines the stiffness of the bearing and this stiffness is positive, in a sense that an increase in load causes a decrease of the distance between said two members.

In accordance with the mentioned other aspect of the invention, the fluid bearing may be compensated so that, contrary to what might be concluded as mentioned hereinbefore, no relative displacement of the bearing member with respect to the load transmitting object is required in order to alter the bearing gap geometry. The compensation is obtained by arranging the bearing in such a way that the change in distance between the bearing surfaces which is required to alter the bearing gap geometry at changing load conditions, is carried out by the compliant surface itself, rather than by the bearing member or housing wherein such compliant surface is mounted. Thus, rather than that the membrane undergoes a displacement or a distortion in a direction away from the opposite bearing surface in order to increase the convergence of the bearing gap, the membrane is now moving towards said opposite bearing surface in order to increase the convergence of the bearing gap. By compensating the bearing in the described way, the bearing stiffness may become much greater and, in the extreme case, may become infinitely great or, in case over-compensation is applied, may become even negative pointing to an increase of the bearing distance for an increasing load.

Figure 8:
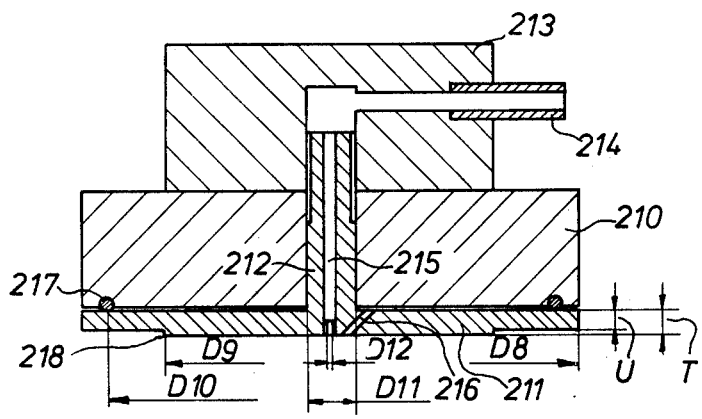
Figure 9:
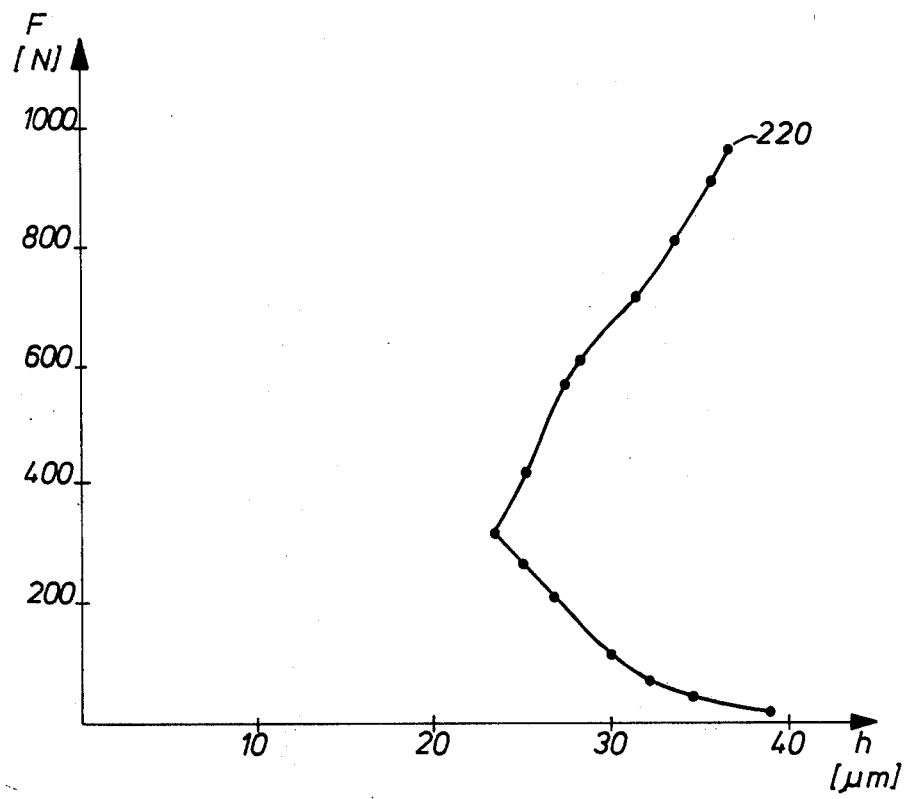
Figure 15:
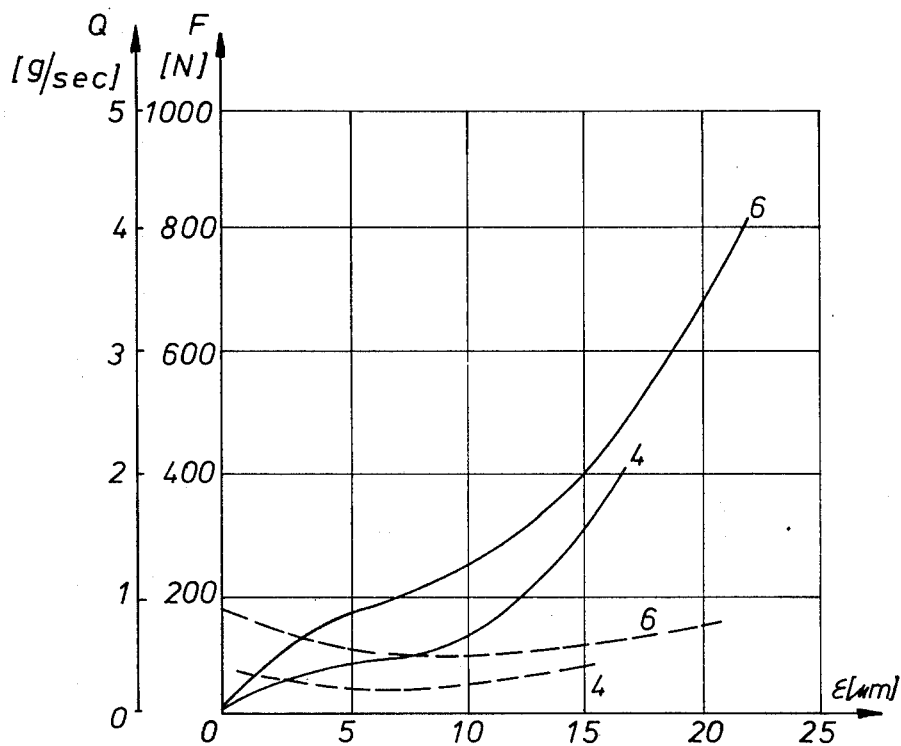
Figure 16:
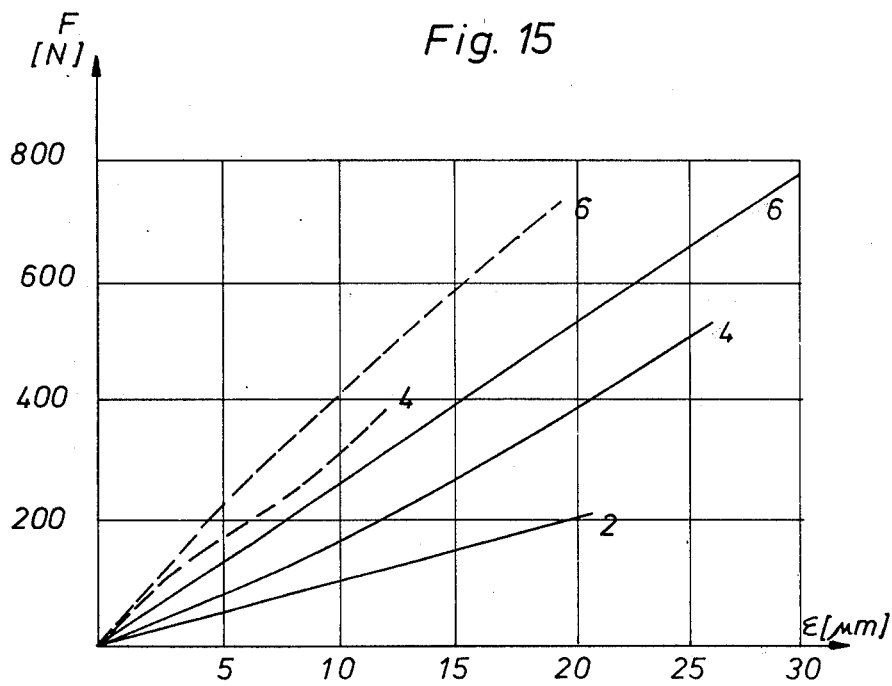
Figure 17:
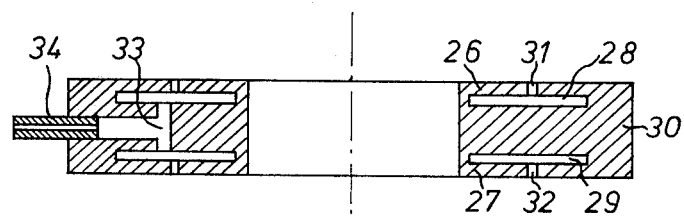
Figure 18:
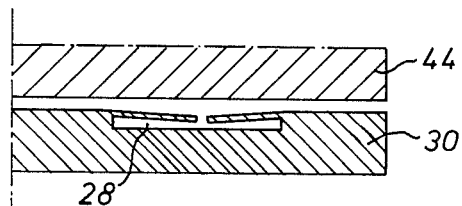
Figure 19:
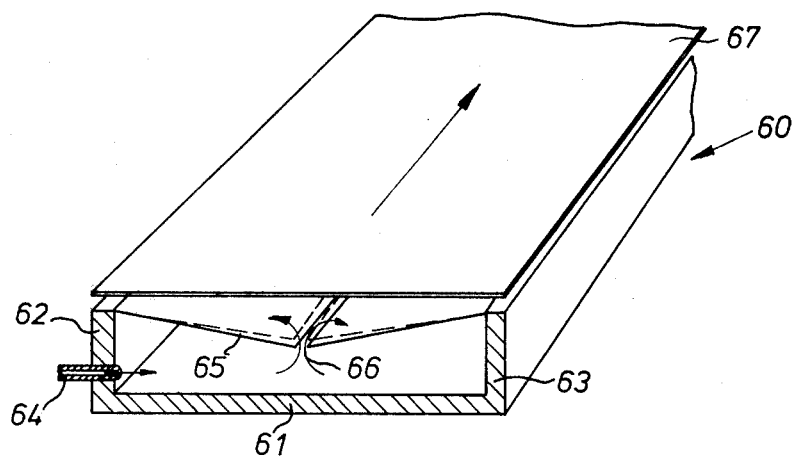
Figure 20:
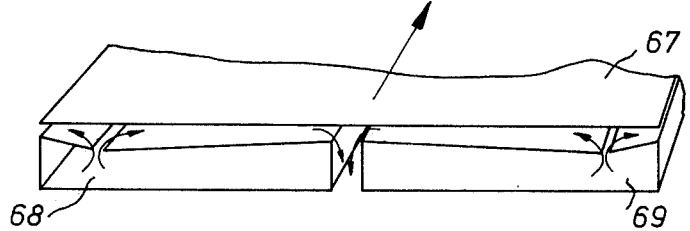
Figure 21:
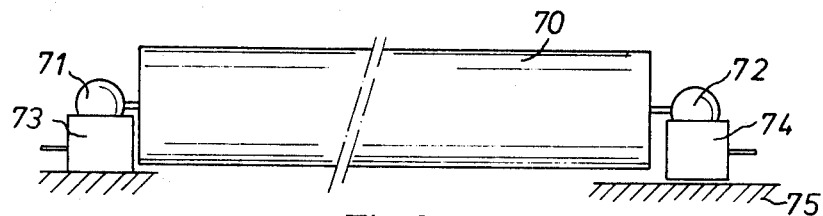
Figure 22:
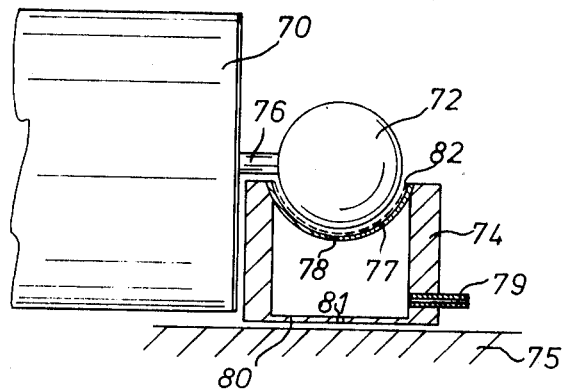
Figure 23:
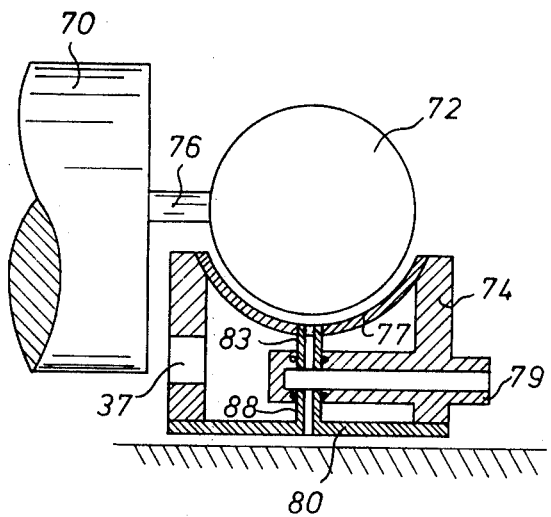
Figure 24:
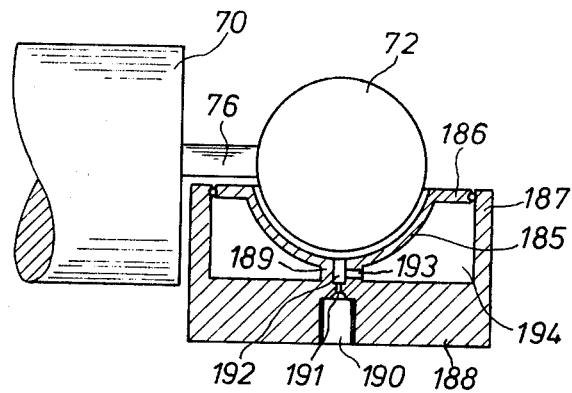
Figure 25:
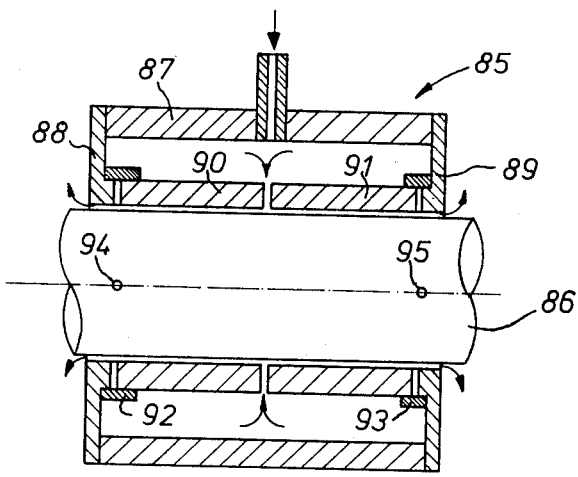
Figure 26:
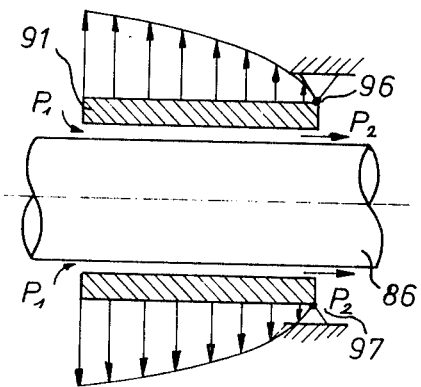
Figure 27:
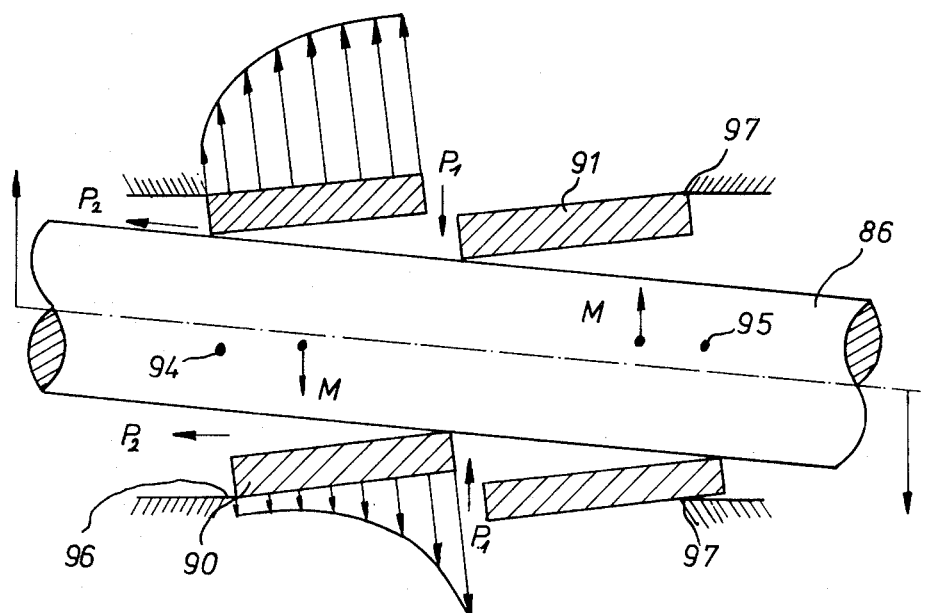
Figure 28:
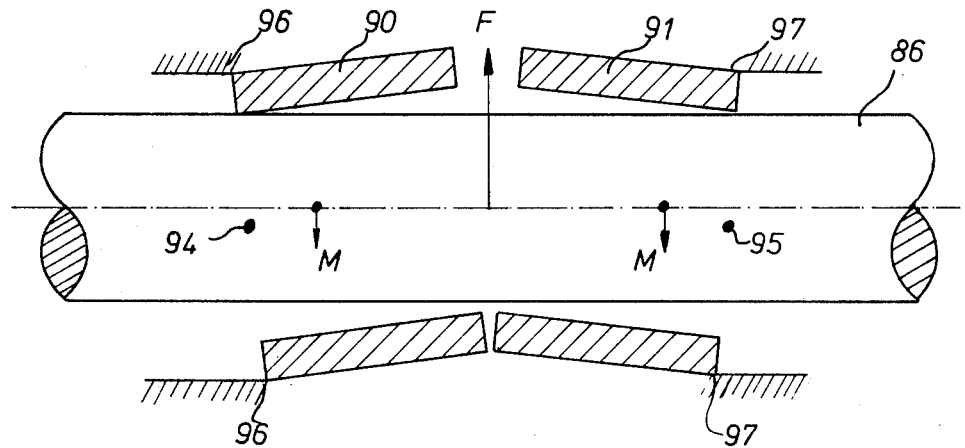
Figure 36:
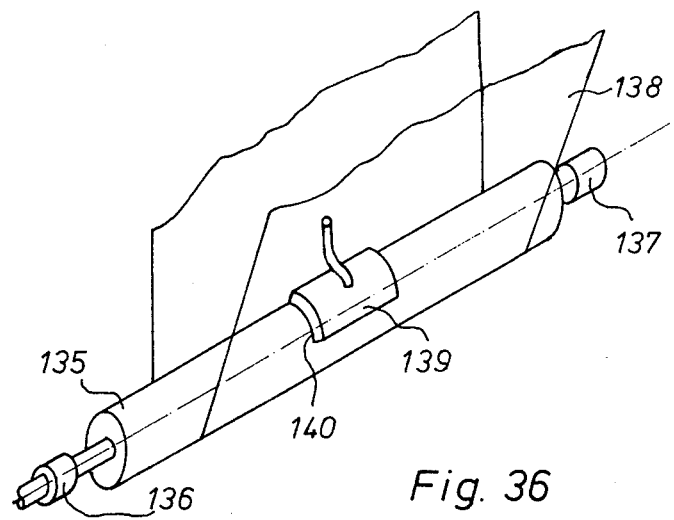

The invention will now be described by way of example with reference to the accompanying diagrammatic drawings wherein:

FIG. 1 is a sectional illustration of a thrust bearing according to the invention, and FIG. 2 is a section on line 2—2 of FIG. 1, FIG. 3 is a diagram of the load capacity and the air consumption as a function of the bearing clearance for a thrust bearing with a compliant bearing surface and a converging bearing gap, FIG. 4 is a similar diagram for a thrust bearing with an undeformable bearing surface and a converging bearing gap, FIG. 5 is a similar diagram for a bearing with an undeformable bearing surface and a straight bearing gap, FIG. 6 is a sectional illustration of a modified thrust bearing according to FIG. 1, FIG. 7 is an illustration of a membrane bearing with compensation and with over-compensation, as compared with an uncompensated bearing, FIG. 8 is a more detailed view of a membrane bearing with increased compensation, and FIG. 9 is a diagram showing the behaviour of this bearing, FIG. 10 is a sectional illustration of an axial bearing according to the invention, FIG. 11 is a view in detail of one form of the membrane of the bearing according to FIG. 10, and FIG. 12 is a section on line 12—12 of FIG. 11, FIG. 13 is a view in detail of another form of the membrane of the bearing according to FIG. 10, and FIG. 14 is a section on line 14—14 of FIG. 13, FIG. 15 is a diagram of the load capacity of a bearing according to FIGS. 10, 11 and 12, and FIG. 16 is a diagram of the load capacity of a bearing according to FIGS. 10, 13 and 14, FIG. 17 illustrates still another form of membrane for the bearing according to FIG. 10, and FIG. 18 is a view in detail of the bearing gap which may be obtained with the membrane according to FIG. 17, FIG. 19 is a perspective view of a bearing according to the invention for supporting a strip of film or paper, and FIG. 20 is a diagrammatic illustration of another bearing for supporting a strip, FIG. 21 is a view of a roller which is rotatably journalled by part-spherical bearings according to the invention, and FIG. 22 is a view in detail of one bearing of FIG. 21, FIG. 23 is a view of another embodiment of a part-spherical bearing, FIG. 24 is a view of a compensated part spherical bearing, FIG. 25 is a radial bearing according to the invention, and FIG. 26 is a pressure diagram for the bearing according to FIG. 25, if unloaded, and FIG. 27 is a pressure diagram for said bearing, if a turning moment is applied, whereas FIG. 28 is a pressure diagram for said bearing, if a radial load is applied, FIG. 29 is a longitudinal sectional view of a cylindrical bearing according to the invention, and FIG. 30, left-hand side, is a section on line 30A—30A of FIG. 29, whereas the right-hand side is a section on line 30B—30B of FIG. 29, FIG. 31 is a longitudinal sectional view of another embodiment of a cylindrical bearing according to the invention, and FIG. 32, left-hand side, is a section on line 32A—32A of FIG. 31, whereas the right-hand side of the figure is a section on line 32B—32B of FIG. 31, FIG. 33 represents diagrammatically different positions of the point of pivotation of a bearing sleeve, FIG. 34 represents a self-adjusting cylindrical bearing, and FIG. 35 is a section on line 35—35 of FIG. 34, FIG. 36 represents a bearing according to the invention used for damping the vibrations of a roller.

Referring to FIG. 1, a self-compensating pressurized thrust bearing comprises two walls 10 and 11 which determine opposed surfaces 12 and 13 which are separated from each other in operation by pressurized fluid, in this case air, flowing in the directions indicated by the arrows. The wall 10 is a flat, polished, rigid wall of a load transmitting object, whereas the wall 11 is a compliant wall in the form of a membrane which is sealed at its periphery to a chamber 14 which is provided with an inlet 15 for connection to a supply of pressurized fluid. The membrane has a central fluid inlet opening 16. The bearing may be loaded by a force F in the direction of the arrow 18, and such load is transmitted by a ball 17 which makes the bearing self-adjusting. The housing 14 and the membrane 11 may have a circular cross-section, as illustrated by the cross-sectional view of FIG. 2. The bearing surface 13 of the membrane 11 is not flat but has rather a small conicity in a sense that the size of the bearing gap between the bearing surface 13 and the flat bearing surface 12 progressively decreases from the rim of the opening 16 towards the periphery of the bearing surface 13 and this over 360 angular degrees. The described configuration of the bearing surface 13 is shown on an enlarged scale in the upper part of FIG. 3 which represents a partial vertical sectional view of the bearing through the opening 16. The meaning of the symbols in FIG. 3 is as follows:

$D_1$ is the overall diameter of the bearing, $D_2$ is the diameter of the compliant bearing wall, $d$ is the diameter of the fluid inlet opening 16, $c$ is the conicity of the bearing gap expressed as the veritcal distance between the periphery of the opening 16 and a plane comprising the periphery of the bearing surface 13, and this is for an unloaded membrane 11, that is to say atmospheric pressure prevailing on both sides of the membrane, $a$ is the thickness of the membrane measured at the periphery of the central opening 16, $s$ is the separation or clearance between the bearing surfaces in operation measured at the periphery of the bearing surface 13, F is the load of the bearing, expressed in kilo-Newton, Q is the flow rate of the pressurized fluid, expressed in g per sec for air, fed to the inlet 15.

The operation of the described bearing is as follows.

The pressure at the upper side of the membrane 11 is equal to the air supply pressure, whereas the pressure at the lower side of the membrane is dependent on the load on the bearing, and on the pressure drop over the opening 16 if the opening is rather small.

The pressure distributions on opposite sides of the membrane will differ when load is applied, and as a consequence the membrane will tend to flex. The mount of flexure will depend upon the load applied.

For example, for an increasing load, the clearance at the bearing rim will decrease and consequently the fluid pressure at points along the fluid flow path between the fluid inlet opening 16 and the fluid outlet at the bearing rim will increase. If the fluid supply pressure and thus the fluid pressure within the housing 14 remains substantially constant, there will be a pressure difference across the membrane causing it to flex away from the load transmitting wall 10. The convergence of the bearing gap this increases until equilibrium is achieved between the pressure differences across the membrane and the stresses induced in the membrane as a result of its deformation. The consequence of this is that a bearing according to FIG. 1 is capable of bearing larger maximum loads under stable conditions than a bearing of comparable dimensions whose bearing surfaces are both constituted by rigid walls.

This difference is illustrated in FIGS. 3 and 4, wherein FIG. 3 represents the measured characteristics of a bearing according to FIG. 1, and FIG. 4 the characteristics of a bearing having a rigid wall in place of a compliant membrane.

The continuous lines in FIGS. 3 and 4 represent the loads of the bearings at supply pressures at which the measurements were carried out, namely at 2, 4 and 6 atmospheres overpressure, and the broken lines represent the consumption of air at the corresponding air supply pressures. The dimensions of the bearings were as follows:

$D_1$ = 97 mm (overall diameter of bearings)

$d_1$ = 0.55 mm (diameter of fluid inlet opening 16 in compliant bearing surface)

$d_2$ = 0.50 mm (diameter of fluid inlet opening in rigid bearing surface)

$D_2$ = 80 mm (diameter of compliant bearing surface)

$a$ = 3.3 mm (thickness of compliant membrane at fluid inlet opening)

$c_1$ = 26 $\mu$M (conicity of unstressed compliant bearing surface) $c_1$ 32 19 $\mu$M (conicity of rigid bearing surface) material of the membrane: steel with a modulus of elasticity of $9 \times 10^{10} N/m^2$.

A comparison of the two diagrams reveals that the bearing with the compliant surface (FIG. 3) is capable of carrying a significantly larger maximum load than the bearing with the rigid surface (FIG. 4). Further, the compliant bearing shows a stiffness which is about 50% greater than that of the rigid bearing. The notion "stiffness" applies to a change of the clearance $s$ for a given change of the load F and it will be understood that an increasing slope of the curves indicates an increasing bearing stiffness. It is known that a convergence which equals zero, as in the case of two parallel bearing surfaces, has the effect that the load capacity and the stiffness of the bearing are much smaller, as is illustrated by the diagram of FIG. 5, wherein $D_1$ = 97 mm and $d$ = 0.55 mm.

Finally, the compliant bearing (FIG. 3) is free of unstable resonance effects (pneumatic hammering) whereas the diagram of FIG. 4 shows that for an air supply overpressure of 6 atmospheres there is a zone of instability where indicated by the section in broken lines of the otherwise continuous curve.

The construction of the bearing according to FIG. 1 may be realized as follows. A massive stud of steel is turned to shape to form the cylindrical part (i.e. the side wall) of the housing 14 and the compliant wall 11. A separate upper wall is then hermetically sealed (not illustrated) to the cylindrical part. The compliant wall 11, which has a uniform thickness, is then given a conical shape at its lower surface 13 by either conical lapping of said surface or by establishing an overpressure (e.g. of air) in the interior of the housing 14 so as to pre-tension the wall 11 whereafter the convexly curved surface 13 is machined to flatness on a surface grinder. It will be understood that other techniques of construction may be used such as die-casting or stamping.

In the bearing illustrated in FIG. 1, the pressure of the air was acting on practically the complete upper surface of the membrane 11. It will be understood that other configurations of the bearing may exist which differ from that illustrated in FIG. 1. For instance, the opening 16 may be considerably larger so that the surface 11 of the wall 13 which is loaded by the pressurized fluid is correspondingly smaller and so that no pressure drop occurs over the opening 16.

According to an extreme configuration, the fluid under pressure which is fed to the bearing gap does not act on the upper surface of the membrane and such an embodiment is illustrated in FIG. 6 wherein the bearing comprises a circular wall 20 which ends at its lower extremity in a membrane 21 which is provided with a fluid inlet opening 22. A supply of pressurized fluid is connected to the opening through a flexible tube 23 and a small pipe 24 connected to the wall 21. It will be understood that in the present case the unstressed conicity of the lower surface of the wall 21 may be much less, since in operation the net pressure acting on the wall 21 is the atmospheric overpressure of the fluid in the bearing gap betwen the two bearing surfaces of the bearing. Thus, in operation, stresses are created in the wall 21 which tend to give its lower surface the desired conical shape.

In the bearing illustrated in FIG. 6 the interior of the housing was at atmospheric pressure. It will be clear that if said housing is closed at the upper side and connected, through an inlet similar to the inlet 15 illustrated in FIG. 1, with a second supply of pressurized fluid, the curvature of the membrane may be controlled by varying the pressure of such second supply. The mentioned second pressurized fluid may be the same fluid as used for creating the bearing pressure, for instance air, or it may be a diffenent fluid, such as another gas or a liquid, e.g. water or oil. In addition to the control of the curvature of the membrane, the said second fluid may have also another function, namely the damping of vibrations of the membrane which may occur as the membrane comes into resonance at some working conditions as described hereinbefore with reference to FIG. 4.

According to another variant embodiment of the bearing according to FIG. 1, the size of the fluid inlet opening 16 may be reduced to such an extent that its order of magnitude approximately corresponds with that of the clearance s in operation of the bearing, so that a considerable amount of the total pressure drop in the fluid, perhaps as much as half, occurs across that opening. Such a type of opening is called a restrictor opening and its main advantage is to cut the consumption of pressurized fluid with almost no adverse effect on the maximum load capacity of the bearing.

According to a further embodiment such restrictor opening may be a variable restrictor opening. For instance, the opening may be arranged to present a greater or a smaller resistence against the passage of the pressurized air as a function of the air pressure in the bearing gap, and such arrangement may further reduce the air consumption while presenting a reduced danger of clogging. We refer to paper D2 relating to "Externally pressurized bearing with pressure dependent restrictors" which was presented at the 6th International Gas Bearing Symposium held from Mar. 27 to 29, 1974 at the University of Southampton, and wherein more details about variable restrictors may be found.

FIG. 7 illustrates the influence of the position of the point of clamping of the compliant bearing surface on the bearing behaviour, and this for a thrust-type bearing as described hereinbefore. FIG. 7(a) represents the right-hand half of a sectional view of a bearing with the membrane clamped at the outer diameter. FIG. 7(b) represents a bearing with a centrally clamped membrane which will hereinafter be referred to as a compensated bearing, and FIG. 7(c) is a bearing wherein the upper surface of the membrane has been enlarged to provide an increased compensation and which will be described as a bearing with increased compensation. The lower halves of FIGS. (a), (b) and (c) are pressure distribution diagrams corresponding with the respective bearings, curve 1 being pressure distribution above the membranes, the curve 2 the pressure distribution below the membranes, and the curve 3 being the loading pressure distribution of the membranes, as a function of the radius r of the membranes.

FIGS. 7(d), (e) and (f) represent the three respective bearings at half load and the corresponding pressure distributions, whereas FIGS. 7(g), (h) and (i) represent the bearings at full load and the corresponding pressure distributions. FIG. 7 (g) shows the non-operating or unstressed position of the bearing embodiment of FIG. 7(a) while FIGS. 7(b) and 7(c) represent the non-operating or unstressed positions of these embodiments.

Finally, FIGS. 7 (j), (k) and (l) represent the stiffness of the different bearing types, expressed as loading force F as a function of the distance h, said distance h being the distance between the clamping point of the membranes and the opposite bearing surface.

The compensated bearing 171 differs from the uncompensated bearing 170 on the following points. A central feeding chamber 173 is provided in the form of a bore which communicates through a restriction opening 174 with another central chamber 175 which communicates directly with the lower side of the membrane 176 and through a bore 177 which the upper side thereof. The mounting of the membrane of the bearing 171 is inversed with respect to the mounting of the membrane of the bearing 170, in a sense that the central portion of the membrane 176 is fixedly attached to the housing of the bearing 171 and the outer rim of the membrane is displaceable with respect to the cylindrical wall of the bearing. The gap between the periphery of the membrane 176 and the bearing housing is air-tightly closed by a so-called O-ring 178 which enables a relative displacement of the opposed surfaces while yet sealing the annular gap.

The bearing 172 with increased compensation differs from the bearing 171 by the upper side 180 of the membrane 182 having a greater operative bearing surface than the lower side 179 of the membrane.

Referring to the unloaded bearings 171 and 172, it will be understood that the pressure of the central chamber 175 is equal to the pressure in the bearing gap and equal to the atmospheric pressure. The membranes of the three different bearings are shown as determining a diverging bearing gap in unloaded condition. It is clear that said gap may also be parallel-sided or also slightly converging at no-load. As the bearing is loaded, the pressure in the central chamber 175 raises to a value which corresponds with the pressure at the upper side of the membrane. In the bearing gap there is an expansion of the pressure so that the pressure in the bearing gap will be lower than the pressure of the central chamber and thus also lower than the pressure at said upper side of the membrane. As a consequence of said pressure difference the membrane is distorted in the direction of the bearing surface 183 so that the convergence of the bearing gap increases.

Since equal bearing gap configurations have equal load capacities, compare the configurations FIGS. 7(d) and (e), it is clear that a bearing with compensation as a consequence of a displacement of the membrane towards the opposite bearing surface has to be displaced over a smaller distance. This difference in displacement is indicated in FIGS. 7(d) and (e) by the distance $p_1$.

The configuration of the bearing 171 with compensation has a reduced loading capacity as a consequence of the negative stiffness at elevated loads; as a matter of fact, up from a certain load there will be no pressure drop over the central feeding restrictor. The pressure above the membrane will be equal to the supply pressure. An increasing load will affect the pressure distribution in the gap only, resulting in a decreased loading pressure distribution 3 of the membrane. This yields a reduction of the membrane deformation and of the convergence of the gap; accordingly the maximum loading force will decrease. This loss is illustrated by the distance $q$ in FIG. 7($k$) which shows the loss of maximum load capacity of the bearing 171 as compared with the bearing 170. The compensation of the bearing 171 at full load is indicated by the distance $p_2$ in FIGS. 7 ($h$) and ($k$).

The load capacity of the compensated bearing may be increased by increasing the surface of the upper side of the membrane as compared with the surface of the lower side thereof. This is done in the bearing 172 by increasing the overall diameter of the membrane 182, and by reducing the operative surface 179 of the lower side of said membrane by milling a peripheral groove as illustrated by the numeral 181.

The result of this configuration is illustrated in FIG. 7($i$) which shows that also at maximum load the convergence of the bearing gap is maintained. FIG. 7 ($l$) shows the compensation $p_3$ which now is practically equal to the compensation $p_1$ at half load.

It will be understood that the relative dimensions and the sealing of the membrane of a compensated fluid bearing may differ from the illustrations in FIGS. 7($b$) and ($c$). For instance, the diameter of the membranes 176 and 182 may be equal to the outer diameter of the bearing housings 171 and 172 so that said membranes extend under the end face 184 of the cylindrical wall of the bearing housing. The sealing of the free end of the membrane in such case may occur by means of an O-ring or the like disposed in a half-circular groove in said end face 183, and it will be understood that the resilience of conventional O-rings or the like is such that compression variations of some tens of micrometers under varying load conditions of the membrane, are tolerated without giving rise to any problem.

An alternative way of sealing the free end of the membranes illustrated in FIGS. 7($b$) and ($c$), comprises the use of an appropriate grease or elastomer compound.

A modified membrane-type bearing as described above wherein the diameter of the membrane equals the outer diameter of the bearing housing is illustrated in FIG. 8, wherein the bearing comprises a circular undeformable body 210, a membrane 211 which is provided with a stud 212 with a central bore 215, and a bearing cap 213 which is screwed on the threaded upper half of stud 212 and which has a nipple 214 which communicates with the central bore of said stud.

The lower extremity of the bore 215 ends into a restrictor opening, while a further bore 216 provides a communication between the lower and the upper surface of the membrane 211. Between the upper surface of the membrane and the lower surface of the body 210 there is formed a chamber the width of which near the central stud is determined by a small spacer ring, not illustrated in the figure. The said chamber is closed near its outer periphery by an elastic O-ring 217. The described bearing number operates the conjunction with a flat wall, not shown in the figure, which is clearly separated from the lower surface of the membrane 212 in a way as illustrated by the wall 183 in FIG. 7, and which constitutes with said membrane a bearing gap of variable geometry. The dimensions of the described bearing, which was manufactured from conventional construction stud, were as follows:

| | | |
|---|---|---|
| $D_8$, outer diameter of the membrane 211 | : 85 | mm |
| $D_9$, diameter of the operative lower membrane surface | : 56.5 | mm |
| $D_{10}$, diameter of the operative upper membrane surface | : 76 | mm |
| $D_{11}$, diameter of the stud 212 | : 8 | mm |
| $D_{12}$, diameter of the restrictor opening | : 0.5 | mm |
| T, thickness of the membrane | : 3.1 | mm |
| U, thickness of the reduced rim portion | : 2.5 | mm |

The behaviour of the described membrane bearings is illustrated by the diagram of FIG. 9 which illustrates the loading force F of the bearing expressed in Newton-values the distance $h$ which is the separation between the central portion of the lower surface of the membrane and the cooperating opposite flat bearing surface (not illustrated). It may be seen that up from a loading of about 300 N the distance $h$ increases rather than decreasing, which points to a negative stiffness. For a loading force of about 1000 N there occurs a physical contact between the lower peripheral edge 218 of the operative lower surface of the membrane and the opposite bearing surface, which point is indicated on the curve by the numeral 220.

FIG. 10 represents an axial air bearing for a rotatable shaft. A shaft 41 ends at its lower extremity in a spindle 42 of reduced cross-section. About the spindle there are provided two rigid discs 44 and 45 which are separated from each other by a spacer 46. The assembly comprising the discs and the spacer is tightened together by a nut 47 which threadedly fits on the lower end of the spindle. A washer 43 is fitted between the nut 47 and the outer disc 45.

The compliant bearing surface of the bearing of FIG. 10 is formed by an annular membrane 48 which is clamped between the bearing house rings 35 and 36, and which is provided with inlet openings, such as the opening 49, for the inlet of pressurized fluid such as air, and with orifices, such as the orifice 50, which are distributed over the generally cylindrical wall 51 at the centre of the membrane. The annular membrane 48 may either be substantially solid as illustrated in FIGS. 8 and 9, or it may be a combination of two coupled membrane portions defining an internal annular channel, as illustrated in FIGS. 13 and 14.

As illustrated in FIGS. 11 and 12, the annular membrane is composed of two annular disc portions 52 and 53 which are bonded to each other by glueing after three radial grooves have been milled in the mutually facing surfaces. The grooves constitute radial channels in the assembled annular membrane and terminate in orifices 50 which are situated in the generally cylindrical central wall 51 of the membrane.

The clamping diameter $D_7$ in FIG. 10 has practically no influence on the bearing stiffness when the membrane of FIG. 13 is used. For the membrane shown in FIG. 11, on the contrary, the bearing stiffness decreases with increasing clamping diameter $D_7$.

Referring to the membrane illustrated in FIGS. 13 and 14, two annular disc portions 54 and 55 which each have an annular groove, are assembled by means of socket-head screws (not illustrated) at equal angular positions near their outer periphery as indicated by the numeral 56 in FIG. 13. The thickness of the annular disc portions at the inner side of the annular channel formed on assembly is slightly greater than their thickness at the outer side of said channel so that the disc portions are coupled to each other at the central wall 51 before their outer circumstances come into contact, and tightening of the screws at positions such as 56 will clamp their centres securely together and impart a measure of convexity to the faces of the assembled annular membrane. These faces are then flattened and made parallel by grinding. The reason therefor is to pre-stress the annular disc portions so that their inner rims will always be in contact, in despite of flexure thereof during operation of the bearing.

Referring again to FIG. 10, it will be seen that a conical clearance exists between both faces of the membrane 48 and the discs 44 and 45. In the operation of the bearing, pressurized air which is forced through the openings 50 into the space between the central wall 51 and the spacer 46 escapes, through the converging bearing gaps at the upper and lower sides of the membrane, to the atmosphere. If the bearing is unloaded and if the weight of the rotatable parts of the bearing is balanced, an equilibrium of forces is established which keeps the membrane at a central position between the discs 44 and 45 as illustrated.

If the bearing is loaded, for instance by applying a vertical force F to the shaft 41, this force is transmitted to the discs 44 and 45, so that the bearing clearance at the upper side of the membrane decreases and the clearance at the lower side increases, and accordingly the pressure distribution becomes different at the two sides of the membrane. The higher pressure acts on the upper side of the membrane, so that an upwardly directed force acting on the shaft 41 is created to form the bearing force of the bearing. As a consequence of the difference in pressures on opposite sides of the membrane, the membrane will deflect whereby the bearing gap at the location of the central wall 51 is increased at the upper side and is decreased at the lower side of the membrane. Thus the previously parallel sided gap portion between the spacer 46 and the central cylindrical wall 51 of the membrane will become convergent towards its upper end, and also, and perphas more importantly, the convergence of the gap between the membrane 48 and the upper disc 44 will increase while the gap between the membrane and the lower disc 45 will decrease in convergence.

In the extreme position, the bearing gap at the lower side of the membrane becomes closed and thus a maximum bearing pressure is obtained at the upper side of the membrane, with ambient pressure at the lower side. This condition represents the theoretical maximum bearing force of the bearing. The maximum practicable bearing force is slightly smaller since it will be understood that in operation any direct contact between the membrane and a rotating part of the bearing should be avoided.

The diagram of FIG. 15 illustrates the performance of the axial bearing described hereinbefore and provided with the membrane according to FIGS. 11 and 12. The displacements $\epsilon$ of the shaft 41 as a function of the load were measured by means of a micro-comparator which was in contact with the lower extremity of the spindle 42. A displacement $\epsilon = 0$ points to an external force $F = 0$. The continuous curves represent the displacement $\epsilon$ as a function of the load F for respective air supply overpressures of 4 and 6 atmospheres, whereas the broken line curves stand for the corresponding flow rates at 4 and 6 atmospheres. The dimensions of the membrane were as follows:

$D_3$ = 95 mm (outside diameter of annular membrane)
$D_4$ = 34 mm (inside diameter of annular membrane)
$D_7$ = 85 mm (clamping diameter)
thickness of the membrane = 6.780 mm
thickness of the ring 46 : 6.815 mm
conicity $c$ of the discs 44 and 45 : 0.005 mm material of the membrane : brass with a modulus of elasticity of $9 \times 10^{10} N/m^2$.

The diagram of FIG. 16 illustrates the performance of the bearing of FIG. 10 while equipped with the membrane according to FIGS. 13 and 14.

The characteristics of the membrane were as follows :

$D_3$ = 95 mm (outside diameter of annular membrane)
$D_4$ = 34 mm (inside diameter of annular membrane)
$D_5$ = 80 mm (outside diameter of annular channel in membrane)
$D_6$ = 42 mm (inside diameter of annular channel in membrane) wall thickness of membrane between annular channel and upper and lower bearing gaps = 2.4 mm
total thickness of the membrane : 9.885 mm
material of the membrane : steel with a modulus of elasticity of $2.1 \times 10^{11} N/m^2$.

The continuous curves express the displacement $\epsilon$ as a function of the load F for a spacer 46 having a thickness of 9.965 mm and discs 44 and 45 having a conicity of 0.028 mm, at overpressures of 2, 4 and 6 atmospheres, whereas the broken line curves express the displacement $\epsilon$ for a spacer 46 having a thickness of 9.930 mm and for a conicity of the discs 44 and 45 of 0.021 mm.

A third embodiment of a membrane which may be used in the bearing of FIG. 10 is illustrated in FIG. 17. The compliant membrane surfaces which may co-operate with the discs 44 and 45 are formed by the outer surfaces of thin deformable annular wall sections 26 and 27 which are determined by ringlike channels 28 and 29 in a massive ring 30. The annular wall sections 26 and 27 are provided with a plurality of small openings such as the illustrated openings 31 and 32, which are spaced at equal angular intervals. The channels 28 and 29 are in connection with each other through a bore 33 which in its turn may be connected via a pipe 34 to a supply of pressurized fluid. The surfaces of the discs 44 and 45 which co-operate with such a membrane may run parallel with each other since the convergent bearing gaps now extend from the series of openings 31 and 32 towards the inner and the outer side of the membrane as illustrated on an enlarged scale in FIG. 18.

It should be understood that the series of distinct openings 31 and 32 may be replaced by corresponding slots or even by one uninterrupted circular groove at each side of the membrane.

A schematic illustration of a bearing according to the invention for supporting a web of a material which is substantially impervious to air is represented in FIG. 19. An elongate air box 60 comprising a horizontal bottom wall 61, two lateral walls 62 and 63, and a front and a rear wall (the latter not illustrated) is provided with inlets for pressurized air, such as the inlet 64 shown, for the creation of an overpressure of air within the box which may escape towards the open top side though an elongate slot 66 in an elongate compliant wall 65. The compliant wall is a membrane in the form of a flexible strip of metal, plastic, or the like, and has a slightly V-shaped form in the transverse direction. A flexible strip 67 may be advanced in the direction of the arrow by suitable means, and is maintained at a stable position free of contact with the air box by a cushion of pressurized air which is formed between the concave side of the membrane 65 and the said web 67.

It can be shown that, in a way similar to that described above, the geometry of the bearing gap between the membrane and the supported web changes as the operating conditions change. Such changes may be due to variations in the air pressure, changes in the weight of the web as a consequence of different materials which are used, different thicknesses of layers which are coated on such web, different drying velocities of wet layers coated on such webs, tension fluctuations in the web as a consequence of vibrations of the driving rollers, or of a tendency of the web to curl in the transverse direction, or to load variations due to self-excited vibrations.

Any such differences in the applied load will entail changes of the geometry of the clearance between the web and the membrane by deflection of the membraned, as illustrated by the broken lines for the case of a deflection towards the strip 67 occasioned by a decrease in load. The described variable geometry of the bearing gap increases the stiffness of the bearing and thereby markedly increases the stability of the web transport.

A possible disadvantage of the arrangement which has just been described is that under certain circumstances the web edges may come rather close to the top of the lateral walls 62 and 63 of the air box and accidental contact may occur.

An improved bearing arrangement is diagrammatically illustrated in FIG. 20 wherein two independent air boxes 68 and 69 are located adjacent to each other.

In an arrangement comprising two, or as the case may be more than two, air boxes, the configuration of the bearing gaps of some or all of the air boxes may be designed asymmetrically. In the illustrated embodiment, the air inlet zone of each of the bearing gaps between the compliant surfaces and the supported web is displaced towards the lateral outer side walls of the air boxes whereby an improved bearing control at the borders of the strip 67 may be obtained. This improved control may be of assistance in coping with curling or vibrating strip borders.

It will be understood that bearings of the type as illustrated in FIGS. 19 and 20 may be used also for supporting kinds of materials other than flexible strips. For instance, the bearings may be used for supporting carriages of machines, which may move in one direction as the illustrated strips or which may move in directions which comprise components which are normal to each other. In the latter case, the bearing may comprise a plurality of bearing boxes which are located adjacent to each other.

The pressurized fluid used for supporting machine carriages and the like need not necessarily be air, it could alternatively be oil, water, steam, etc.

Another embodiment of the present invention wherein a compliant bearing surface is formed by a membrane is illustrated in FIGS. 21 and 22. A roller 70, which may be for instance one of a plurality of web conveyance rollers in a drier for drying wet layers which have been coated onto a continuously advancing web, is journalled for free rotation about its axis by means of balls 71 and 72. The balls are rigidly connected at the extremities of the roller and form togehter with the supports 73 and 74 part-spherical air bearings. The support 73 is mounted immobile whereas the support 74 is arranged for small displacements in a direction parallel to the axis of the roller. The mentioned mobility of the bearing support 74 has been diagrammatically illustrated by the small clearance existing between the support 74 and its related base 75. The purpose of this additional degree of freedom is to eliminate any load force on the bearings in a direction along the axis of the roller 70. Axial forces may for example occur due to an incorrect adjustment of the mutual distance of the bearing cups, or by changes in the distance between the balls as a consequence of changes in the roller length by temperature variations.

The bearing at the right-hand side of the roller is illustrated in detail in FIG. 22. The ball 72 is fixedly connected by means of a short spindle 76 to the roller 70. This ball 72 forms an air bearing together with the generally spherically curved membrane 77 which is fitted to the support 74. The membrane is provided with an opening 78 through which pressurized air, which is fed to the interior of the support through a connection 79, may flow between the membrane and the corresponding section of the peripheral surface of the ball.

The lower wall 80 of the support may also form a membrane which has an opening 81; this set-up can be compared with the compliant wall of the bearing illustrated in FIGS. 1 and 2.

The construction of the cup bearing proceeded as follows. The ball 72, which forms the most critical part of the bearing, was one ball of a conventional roller bearing and thus combined a very low cost price with a very high degree of accuracy. The ball was provided with a bore machined by electro-erosion and after the bore was made, the spindle 76 was cemented into the bore. The opposite end of the spindle was screwed into an axial bore of the roller. The membrane consisted of a foil of aluminum which was shaped to the required form by using the ball 72 as a punch and the support 74 as the related die. After this operation, the membrane thus formed was cemented at its outer rim to the corresponding inner rim of the support 74, and finally provided with an opening 78. The lower wall 81 of the support 74 forms an integral part with the cylindrical portion of the support 74 and its lower surface has a concave shape which may be obtained for example by one of the two techniques described hereinbefore with reference to FIG. 1.

The following parameters pertain to the described ball and cup bearings :
weight of the roller : 25 kg
diameter of the bearing balls : 50 mm
thickness of the aluminium membrane : 0.25 mm
diameter of the opening 78 : 0.5 mm
air supply pressure : 3 to 6 atmospheres
air consumption for both ball bearings and the thrust bearing : about 0.4 m$^3$/h
stiffness of the bearings : about 20N/$\mu$m The finishing of the bearing surface of the membrane 77 took quite some time as a consequence of the repeated local lapping of the membrane surface which was required after the spherical forming in order to ensure a uniform clearance between the ball 72 and the membrane surface. An improved design of said bearing was obtained using a liquid polymer which was poured between said ball and said membrane 77, said ball being coated with an appropriate sealant agent, so that after solidification of said plastic a layer was obtained which intimately adhered to the aluminium membrane and the concave side of which was in fact a perfect reproduction of the surface of the ball. Said layer is represented by the broken line 82 in FIG. 22. The layer was made by means of Liquid-type Devcon WR, an epoxy tooling compound marketed by Devcon Cy. The thickness of the solidified layer at the centre was about 40 μm.

The required convergence of the part-spherical bearing gap in the direction from the fluid inlet opening 78 towards the outer bearing rim can be obtained as follows.

According to a first technique, the formation of a part-spherical membrane by using the ball as a punch proceeds while an overpressure, the hole 78 being not yet formed, is maintained within the housing 74. As the ball is removed and ambient air pressure is re-established in the housing, stresses are created in the membrane which tends to bend further. The effect of these stresses is maximum at the centre of the membrane and zero at the peripheral edge so that in that way the desired deviation of the curvature of the membrane from the truly spherical form is obtained, to ensure the convergence of the bearing gap.

According to a second technique, the shaping of the membrane per se occurs without overpressure at the innerside of the housing 74. A liquid plastic as described hereinbefore is then introduced between the ball and the membrane, and an overpressure of air is established within the housing 74 until the plastic has cured.

A modified embodiment of the part-spherical bearing of FIG. 22 is illustrated in FIG. 23 wherein the same numerals stand for the same members. A membrane 77 is connected via a small pipe 83 with a feed pipe 79. The mentioned connection occurs as follows. The pipe 83 slidingly fits in a corresponding bore in the pipe 79 and an O-ring seals this slideable connection. In this way, the membrane 77 is free to be deformed in operation of the bearing since the pipe 83 is free to move with respect to the pipe 79. The membrane 80 is connected in a similar way through a pipe 84 with the feed pipe 79. The housing 74 is further provided with an opening 37 so that the interior of the housing is at ambient pressure.

It will be understood that the operation of the membranes 77 and 80 can be compared with the operation of the membrane 21 described hereinbefore with reference to FIG. 6.

The compliant wall of the bearings described so far was designed as a membrane; the compliant walls of the bearings which will be described below are formed by walls which of themselves undergo no deformations as such during the variations of the geometry of the bearing clearance. The wall elements are rigid, but can be displaced with respect to an opposing bearing surface.

FIG. 24 illustrates a membrane-type half spherical fluid bearing which has been compensated in order to increase the stiffness of the bearing as set forth in the introduction of the present specification.

Referring to the figure, a ball 72 which is fixedly connected to a roller 70 by a spindle 76, forms a fluid bearing with the generally spherically curved membrane 185. The membrane ends, into a flat rim portion 186, the outer edge of which may be displaceably sealed by means of an O-ring, a ringlike bellows, or the like, to the innerside surface of the cylindrical wall 187 of the bearing housing 188. The membrane is rigidly fitted to the bearing by means of the central stud 189. The bearing is provided with a threaded bore 190 wherein a nipple may be screwed for connection to a suitable source of fluid supply, and further with a restrictor opening 191, a central chamber 192 which is a bore with a diameter in excess of the diameter of the restrictor opening, and an opening 193 for connection of the central chamber with the interior 194 of the bearing. It will be understood that the operation of this bearing is similar to the operation of the compensated bearings described hereinbefore with reference to FIG. 7, so that at increasing load the convergence of the bearing gap increases as the outer rim portion of the membrane 185 moves upwardly so that, in the case of a perfectly compensated bearing, the ball 72 has not to carry out any vertical displacement in order to control the geometry of the bearing gap.

Referring to FIG. 25, a radial sleeve bearing 85 for a rotatable shaft 86 comprises a stationary cylindrical housing 87 with end walls 88 and 89 which are hermetically sealed to the housing. Two bearing sleeves 90 and 91 which fit with a certain clearance over the shaft 86 are connected at their remote ends to the end walls of the bearing by means of elastic rings 92 and 93 which form an airtight sealing between the walls 88, 89 and the corresponding sleeves 90 and 91, and which also enable the sleeves 90 and 91 to pivot about imaginary points 94 and 95 which are roughly situated on the axis of the shaft. If no load is applied to the shaft, and neglecting the weight of the shaft, the bearing sleeves 90 and 91 run strictly parallel with the shaft as is illustrated in the pressure diagram of FIG. 26, which shows the pressure distribution in the bearing gap between the sleeve 91 and the shaft taken in a vertical plane that comprises the axis of the shaft. In said diagram, $P_1$ is the bearing gap air supply pressure within the bearing house 87 whereas $P_2$ is the atmospheric pressure. The points 96 and 97 are the supporting points of the respective upper and lower sleeve sections at the opening in the wall 89. The pressure patterns above and below the shaft are equal so that no net load-supporting force is created.

If the shaft 86 is loaded however, the pressure distributions in the bearing gaps will alter. This may be done in one of two ways, or a combination of such ways, depending on the type of laod applied to the shaft.

If a turning moment F is applied to tilt the axis of the shaft (FIG. 27) then the bearing gaps will decrease in size at opposite sides or the shaft in the regions surrounded by the two bearing sleeves 90, 91. This will cause a variation in the pressure distributions in the bearing gaps so that the sleeves 90, 91 will tend to pivot about respective pivot points 94, 95 to the positions shown in FIG. 27, the ends of the sleeves at the inlet zone moving in opposite directions. This pivoting movement will be resiliently resisted by the elastic rings 92, 93, which thus act as springs. The pressure distrubtion in the bearing gap surrounded by the left hand sleeve 90 will then be generally as shown, and this will give rise to a load supporting reaction force M on the shaft. Similarly a load-supporting reaction force M will be created due to the movement of the right-hand sleeve 91. These forces M will form a turning moment which at equilibrium will balance the applied moment F on the shaft.

If on the other hand a lateral displacement force F is applied to the shaft 86, the two sleeves 90, 91 will pivot, again about respective points 94, 95, but in this case so that their ends adjacent the gas inlet zone move in the same sense, as shown in FIG. 28. Load supporting reaction forces M are again created in each bearing gap, and at equilibrium their resultant balances the applied load F.

If the axial distance between the adjacent ends of the bushings 90 and 91 is in the order of magnitude of the mominal (unloaded) bearing clearance, a so-called pressure-dependent restrictor is formed because the geometry of the axial gap between the bushes 90 and 91 is going to change considerably when the two bushings pivot about the points 94 and 95, so that the rate of air supply will automatically be cut at the side of the bearing where a reduced pressure is required and will be correspondingly increased at the bearing side where an increased demand of air for establishing an increasing bearing pressure, exists. This is clearly shown in FIG. 28, illustrating the widened inlet opening at the upper side, and the almost closed inlet opening at the lower side of the shaft.

Practical constructons of cylindrical bearings according to the principle of the bearing illustrated in FIG. 25, are shown in FIGS. 29 to 35.

Referring to FIGS. 29 and 30, the bearing comprises a cylindrical housing 100 with end rings 101 and 102 which may be fitted to the housing by socket head screws or the like. The compliant wall of the bearing is formed by a single sleeve 103 which is divided by three groups of two pairs of slots, such as the group of slots 108 and 109 into four sleeve portions 104 to 107. Each slot is in fact a cut through the wall of the sleeve 103 over about 170 angular degrees so that a pair of slots leaves only two opposite small sections of the wall, as is illustrated for instance in FIG. 29 by the section 110 for the slots 108 and by the sections 111 for the slots 109. The slots 109 are shifted over 90 angular degrees with respect to the slots 108. FIG. 30 represents two different cross-sectional views of FIG. 29, namely the left-hand part A being a section on line 30A—30A of FIG. 29 and the right-hand part B being a section on line 30B—30B of FIG. 29.

The purpose of the mentioned slots is to establish the elastic springs required to sustain the load supporting force constituted by the fluid pressure distribution within the gap between the sleeve 103 and a shaft (not shown). Sleeve portions 105 and 106 function as compliant walls whereas the respective portions 104 and 107 are rigidly connected to the adjacent rings 101 and 102. Two resilient rings 112 and 113 air-tightly close the periphery of the sleeve 103 at the slot zones extending between the sleeve portions 104, 105, and 106, 107.

During the operation of the bearing, pressurized air is fed through the connection 114. By the effect of a downward load on the shaft (not shown) which is journalled in the sleeve 103, the sleeve portions 105 and 106 will carry out pivoting movements with respect to the portions 104 and 107, whereby at the lower side of the shaft a bearing gap will be formed between the sleeve portions 105 and 106 which gap converges towards the portions 104 and 107, whereas at the upper side a corresponding diverging bearing gap will be created.

In the bearing just described, the compliant sleeve portions 105 and 106 are coupled to each other by the small wall sections remaining between the central group of slots separating said portions. As a consequence of those couplings, the sleeve portions 105 and 106 are forced to carry out equal pivotal displacements which, moreover, are directed in the opposite sense, so that this kind of bearing is capable of suporting radial load charges only.

A bearing which is capable of supporting both radial loads and axial tilting loads on a shaft, is illustrated in FIGS. 31 and 32. Within a stationary cylindrical housing 120 two distinct bushings are mounted which comprise a collar section 121, 122 and a cylindrical section 123 and 124. The flexible connection between each collar and the corresponding cylindrical section is obtained by two pairs of angularly staggered grooves or cuts in a way similar as described hereinbefore for the bearing illustrated in FIGS. 29 and 30. The sections 123 and 124 form the displaceable walls of the bearing. However, those elements do not directly co-operate with the shaft (not shown) which is to be journalled. Sleeves 125 and 126 are press-fitted in the sections 123 and 124. The inner peripheral surfaces of these sleeves form the bearing surfaces for the shaft. The sleeves 125 and 126 are air-tightly sealed against the outer rings 131 and 132 of the bearing by means of U-shaped resilient rings 133 and 134. As a consequence of the described bearing configuration the two bearing sleeves may operate independently from each other; also, pivoting of the movable bearing surface occurs around a point that is situated within the effective length of the bearing surface. The effective length is indicated by L in FIG. 31. The imaginary pivot points are indicated by numerals 127 and 128. In the bearing of FIG. 29, the pivot points 129 and 130 are situated beyond the effective length L of the bearing sections 105 and 106. The advantage of having the pivot points disposed according to FIG. 31 as opposed to the situation according to FIG. 25 consists in a larger radial stiffness of the bearing.

This increased stiffness will easily be understood, since it is based on the same principle as explained already hereinbefore, namely movement of the compliant bearing surface, at least partly, towards the opposite bearing surface rather than away therefrom, in order to increase the convergence of the bearing gap. The described mechanism is illustrated more schematically in FIG. 33 which shows a shaft 200 which is journalled in a sleeve bearing 201 which may be considered as the equivalent of the sleeves 105 or 125 at the left hand side of FIGS. 29 and 31. The air inlet zone in FIG. 33 is situated at the right-hand side of the bearing gap as indicated by the arrow 202.

If the point of pivotation of the sleeve coincides with the point of attack of the resultant of the air pressure on said sleeve, then there is no longer an adjusting couple. This position is indicated by the numeral 203 in FIG. 33. At a given load, the bearing sleeve 201 may positioned with the help of an exterior adjusting means at such an angle that the radial displacement of the shaft is zero, what corresponds with an infinite stiffness, thus acting so, any desired stiffness can be obtained by proceeding in this way. If the point of pivotation would be provided in position 204 or 205, the shaft would have to carry out a radial displacement $h_2$, respectively $h_1$, in order to obtain the same configuration of the bearing gap. Finally, it may be depcited from FIG. 33 that when the operative surface 206 of the compliant bearing surface is smaller than the interior surface of the bearing sleeve according to its complete length, a very low stiffness will be obtained.

A cylindrical bearing which is self-adjusting is illustrated in FIGS. 34 and 35.

The bearing comprises two sleeves 142 and 143 which fit with some clearance over a shaft 144. The sleeves are mounted in a bushing 145 by means of solid rings 146, 147 and spring rings 148 and 149. The function of the rings 146 and 147 is to positively secure the axial position of the sleeves in the plane of said rings while tolerating, a slight tilting of said sleeves about pivot points which are situated on the common axis of the sleeves at its point of intersection with the plane of the rings.

The function of the spring rings 148 and 149 is to provide the reaction force of the bearing. The form of ring 149 is clearly illustrated in FIG. 35 which is a section on line 35—35 of FIG. 34. The ring is provided with reduced cross-sectional zones at three positions which are angularly shifted over 120 degrees so that three projections, such as the projection 150, are in elastic contact with the bushing 145.

In this way, the ends of the sleeves 142 and 143 which are adjacent to each other may carry out small radial displacements whereby the variable geometry of the bearing gap between the sleeves and the shaft is obtained.

The bushing 145 is mounted within the cylindrical bore of the inner ring 151 of a self-adjusting bearing. The outer ring of said bearing, namely the ring 152 is mounted in a bearing block comprising a base 154 and a cap 155. The sealing of the sleeves 142 and 143 against end rings 156 and 157 of the bearing occurs by resilient rings 158 and 159. Air pressure may be admitted through a connection such as the connection 153 shown at the left-hand side.

The rings 146 is provided with openings (not shown) so that the air supply pressure may be evenly distributed through the space between the sleeves 142 and 143 and the bushing 145.

It should be noted that in operation of the bearing there occurs no rotation between the ring 151 and the ring 152.

The only purpose of the adjustable bearing comprising said rings is to make the air bearing self-adjusting so that accurate alignment which is indispensable in view of the very small bearing clearance, may be omitted when the bearing is installed. The rings 151 and 152 can move relatively when the bearing is installed to give the necessary accurate alignment, and they can then be relatively clamped in place, if necessary.

An arrangement according to the present invention wherein the bearing thrust is used for its damping effect rather than for its supporting effect, is illustrated in FIG. 36. A roller 135 which may be journalled for rotation in conventional roller bearings 136 and 137, is used for deflecting the path of a running web 138, shown transparent in the figure. The roller itself has a limited dynamic stiffness so that it can easily vibrate. The amplitude and the frequency of the roller vibrations do not only depend on the roller characteristics, but they are also influenced by the relative dynamic stiffness of the web. Further, resonance frequencies associated with the tensioned web may yield additional vibration patterns for the roller. Vibration of the roller may be reduced by providing a gas bearing 139 for the roller at a position which may be situated about half way along the roller and which may coincide with the bisector of the wrapping angle of the web about the roller. The air bearing 139 has a compliant wall in the form of a membrane which determines a cylindrically curved bearing surface. The effect of the bearing comes down to a three point support of the shaft so that higher resonance frequencies associated with lower amplitudes will be obtained.

We claim:

1. A fluid-static bearing for supporting a load transmitting object wherein a surface of the bearing and a surface of a portion of said load transmitting object together define a bearing gap and wherein one of said surfaces is compliant and comprises a fluid inlet zone connected with an external supply of pressurized fluid at a substantially constant pressure for introduction of such fluid at a substantially constant pressure through said inlet opening into said bearing gap so that said fluid under pressure can flow along said gap from said inlet zone to one or more fluid outlet zones located at an outer extremity of said bearing gap, so that at any bearing load within a certain range the said gap will exhibit, where load supporting reaction forces occur, convergence in the direction of fluid flow, and any increase in such load within the said range will cause a relative displacement of said sufaces involving an increase in said convergence.

2. A fluid bearing according to claim 1, wherein said convergence is exhibited over at least the greater part of the distance between said fluid inlet and outlet zones.

3. A fluid bearing according to claim 1, wherein said convergence is exhibited from a position at the fluid inlet zone.

4. A fluid bearing according to claim 1, wherein said convergence is substantially continuous to avoid abrupt changes and the abrupt onset of changes in the size of the bearing gap in the direction of fluid flow.

5. A fluid bearing according to claim 1, wherein said surface of the bearing is compliant.

6. A fluid bearing according to claim 5, wherein said compliant bearing surface is a membrane.

7. A fluid bearing according to claim 6, wherein said membrane is an annular disc fixed at its outer rim whose inner rim portion defines a substantially cylindrical surface having at least one fluid inlet opening, and wherein said bearing gap is defined by opposite faces of said annular disc and respectively opposed surface portions of the supported load transmitting object.

8. A fluid bearing according to claim 7, wherein said annular disc comprises two annular disc portions bonded together to determine an internal annular channel with which a plurality of said fluid inlet opening are in communication.

9. A fluid bearing according to claim 6, wherein said membrane is circumferentially sealed to form one wall of a chamber in communication with said fluid supply.

10. A fluid bearing according to claim 6, wherein said membrane is circumferentially sealed to form one wall of a chamber, such chamber being in communication with a supply of fluid at a pressure which is independent of the pressure of said fluid under pressure fed to the inlet opening.

11. A fluid bearing according to claim 10, wherein said chamber is open to atmosphere.

12. A fluid bearing according to claim 6, wherein said membrane is in the form of a strip fixed at its longitudinal edges and comprising an inlet opening slot running parallel to its longitudinal axis.

13. A fluid bearing according to claim 1, wherein said compliant surface of the bearing is arranged in such a way that it may carry out a displacement in a direction towards the opposite bearing surface upon increasing loading of the bearing, thereby to compensate the bearing and thereby to increase the stiffness of the bearing.

14. A fluid bearing according to claim 13, wherein said compliant surface of the bearing is a membrane which is fixed at its central portion to a bearing housing, and the peripheral portion of which is capable of moving with respect to the central portion, and is fluid-tightly sealed with respect to an adjacent wall portion of said bearing housing.

15. A fluid bearing according to claim 14, wherein the operative surface of said membrane which faces the opposite bearing surface is smaller than the operative surface of the membrane which is remote of said opposite bearing surface.

16. A fluid bearing according to claim 5, wherein said compliant surface of the bearing is mounted for angular displacement relative to the supported load transmitting object in dependence on variations in the distribution of fluid pressure in the bearing gap which are consequent upon variations in the applied load.

17. A fluid bearing according to claim 16, wherein said compliant surface of the bearing is a surface of a bearing sleeve.

18. A fluid bearing according to claim 17, wherein the bearing gap is substantially parallel sided when no load is applied.

19. A fluid bearing according to claim 17, wherein said sleeve is mounted for pivotal movement about a point closer to the fluid outlet zone or zones than to the fluid inlet zone.

20. A fluid bearing according to claim 17, and comprising spring means resiliently opposing angular movement of said sleeve relative to the supported load transmitting object.

21. A fluid bearing according to claim 17, and comprising two axially aligned sleeve portions each defining one wall of a bearing gap having a fluid inlet zone at the adjacent ends of such sleeve portions.

22. A fluid bearing according to claim 20, which is substantially symmetrical about the fluid inlet zone.

23. A fluid bearing according to claim 21, wherein the adjacent ends of the sleeve portions are relatively independently movable.

24. A fluid bearing according to claim 16, wherein said angular displacement of the compliant surface of the bearing occurs about a point of pivotation which is situated between the fluid outlet zone and the center of the distance between the fluid inlet and outlet zones, thereby to increase the bearing stiffness.

25. A fluid bearing according to claim 1, wherein said compliant surface of the bearing has a spherical curvature.

26. A fluid bearing according to claim 1, wherein said fluid inlet zone comprises one or more restrictor openings.

27. A fluid bearing according to claim 26, wherein the size of said one or more restrictor openings is variable in compliance with variations in the distribution of fluid pressure in the bearing gap which are consequent upon changes in the applied load.

28. A fluid bearing according to claim 1, wherein said fluid is air.

* * * * *

UNITED STATES PATENT AND TRADEMARK OFFICE
CERTIFICATE OF CORRECTION

PATENT NO. : 4,045,098
DATED : August 30, 1977
INVENTOR(S) : Eric Jozef Blondeel It is certified that error appears in the above-identified patent and that said Letters Patent are hereby corrected as shown below:

In the Heading:

Item [30] Foreign Application Priority Data should be corrected to read:

-- Oct. 8, 1974     United Kingdom .......43554/74

July 11, 1975     United Kingdom .......43554/74 --.

Signed and Sealed this

Twenty-second Day of November 1977

[SEAL]

*Attest:*

RUTH C. MASON
*Attesting Officer*

LUTRELLE F. PARKER
*Acting Commissioner of Patents and Trademarks*